US007827165B2

(12) United States Patent
Abernethy, Jr. et al.

(10) Patent No.: US 7,827,165 B2
(45) Date of Patent: Nov. 2, 2010

(54) PROVIDING A SOCIAL NETWORK AWARE INPUT DICTIONARY

(75) Inventors: Michael N. Abernethy, Jr., Pflugerville, TX (US); Travis M. Grigsby, Austin, TX (US); Daniel E. Morris, Round Rock, TX (US); Frank A. Nuzzi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 11/856,312

(22) Filed: Sep. 17, 2007

(65) Prior Publication Data
US 2009/0077130 A1    Mar. 19, 2009

(51) Int. Cl.
G06F 17/30 (2006.01)
(52) U.S. Cl. .................................. 707/708; 707/736
(58) Field of Classification Search ................ 707/708, 707/736
See application file for complete search history.

(56) References Cited

U.S. PATENT DOCUMENTS

| 4,930,077 | A  | * | 5/1990  | Fan ................................ 704/8 |
| 5,251,316 | A  | * | 10/1993 | Anick et al. ........................ 1/1 |
| 5,371,673 | A  | * | 12/1994 | Fan ................................ 704/1 |
| 5,389,922 | A  | * | 2/1995  | Seroussi et al. ................ 341/51 |
| 5,845,306 | A  | * | 12/1998 | Schabes et al. .............. 715/209 |
| 5,896,321 | A  | * | 4/1999  | Miller et al. ........... 365/189.15 |
| 6,973,427 | B2 | * | 12/2005 | Hwang et al. ................ 704/249 |
| 7,039,634 | B2 | * | 5/2006  | Xu et al. ............................... 1/1 |
| 7,739,257 | B2 | * | 6/2010  | Ellis ........................... 707/706 |
| 2003/0135582 | A1 |   | 7/2003  | Allen et al. |
| 2004/0128140 | A1 |   | 7/2004  | Deisher |
| 2006/0271526 | A1 | * | 11/2006 | Charnock et al. .............. 707/3 |
| 2006/0277030 | A1 | * | 12/2006 | Bedworth ...................... 704/4 |
| 2008/0243834 | A1 | * | 10/2008 | Rieman et al. ................. 707/5 |
| 2010/0063880 | A1 | * | 3/2010  | Atsmon et al. ........... 705/14.53 |

OTHER PUBLICATIONS

Riva et al., "Context-Aware Migratory Services in Ad Hoc Networks", IEEE Transactions on Mobile Computing, vol. 6, No. 12, Dec. 2007, pp. 1-16.
Gross et al., "Information Revelation and Privacy in Online Social Networks", Proceedings of the 2005 ACM workshop on Privacy in the electronic society (WPES'05), ACM, Nov. 7, 2005, pp. 71-80.

(Continued)

Primary Examiner—John R. Cottingham
Assistant Examiner—Alexandria Y Bromell
(74) Attorney, Agent, or Firm—Stephen J. Walder, Jr.; David A. Mims, Jr.

(57) ABSTRACT

Mechanisms for providing a social network aware input dictionary are provided. A social network of users is monitored to determine the words and terms utilized by the users as part of their communication and interaction within the social network. Words and terms are ranked, or prioritized, within the social network based on a determined increase/decrease in popularity of the words/terms as determined from the monitoring of the social network. Based on the ranking of these words/terms, individual input dictionaries associated with devices used by the users of the social network may be automatically updated to include/remove these words/terms and/or increase/decrease a relative priority of the words/terms within the input dictionaries. Such automatic updating may be performed regardless of whether the particular user has used the word/term or not.

18 Claims, 5 Drawing Sheets

OTHER PUBLICATIONS

Ide et al., "Introduction to the Special Issue on Word Sense Disambiguation: The State of the Art", Association for Computational Linguistics, vol. 24, No. 1, Mar. 1998, pp. 1-40.

"T9 (predictive text)", Wikipedia, http://en.wikipedia.org/wiki/T9_%28predictive_text%29, 2 pages, Sep. 17, 2007.

Hall, Justin, "Adaptive Disambiguation", TheFeature:: It's All About the Mobile Internet, http://www.thefeaturearchives.com/topic/Technology/Adaptive_Disambiguation.html, 4 pages, Sep. 17, 2007.

"Tegic Reveals the Year's Most Buzzworthy Additions to T9 Dictionary", T9 Solutions—News, http://www.tegic.com/news/press-view.asp?release_num=23, 4 pages, Sep. 17, 2007.

Riva et al., "The Urbanet Revolution: Sensor Power to the People!", IEEE Pervasive Computing Magazine, special issue on Building a Sensor-Rich World, Apr.-Jun. 2007, vol. 6, No. 2, pp. 41-49.

Riva et al., "The DYNAMOS Approach to Support Context-aware Service Provisioning in Mobile Environments", Elsevier Journal of Systems and Software, 2007, pp. 1-32.

Riva et al., "Context-aware Migratory Services in Ad Hoc Networks", IEEE Transactions on Mobile Computing, 2007, pp. 1-16.

Orajarvi, Olli, "Context aware computing", http://www.cs.helsinki.fi/u/riva/Courses/presentations/slides_orajarvi.pdf, 16 pages, Sep. 17, 2007.

* cited by examiner

PROVIDING A SOCIAL NETWORK AWARE INPUT DICTIONARY

BACKGROUND

1. Technical Field

The present application relates generally to an improved data processing system and method. More specifically, the present application is directed to a system and method for providing a social network aware input dictionary.

2. Description of Related Art

A social network is a social structure made of nodes (which are generally individuals or organizations) that are tied by one or more specific types of relations, such as values, visions, ideas, financial exchange, friendships, kinships, dislikes, trade, etc. Social network analysis views social relationships in terms of nodes and ties. Nodes are the individual actors within the networks and ties are the relationships between the actors. There may be many kinds of ties between the nodes. In its simplest form, a social network is a map of all of the relevant ties between the nodes being studied.

With the advent of the Internet, new digital social networks have evolved. Examples of digital social networks include news and chat groups, on-line forums, social websites, and the like. Such digital social networks provide a mechanism through which individuals and organizations may communicate with other individuals/organizations that may be locally or remotely located and which have similar or related interests, i.e. ties. One characteristic with digital social networks is that the ties tend to be hard-coded into the digital social network, e.g., news groups and chat groups are established for a specific interest or purpose to which all the members subscribe. Such digital social networks may comprise many individuals/organizations from various geographical locations across the globe.

Each digital social network may be directed to specific specialized interests/goals. Because of the specialized nature of these interests/goals, members of such digital social networks tend to adopt their own terms to describe those interests/goals. These terms may not be readily apparent to those new to the digital social network. Moreover, those terms may be similar to other terms in other contexts which may have a different meaning in the other contexts. Many times, such digital social networks use text-based communication, e.g., instant messages, electronic mail messages, etc., for sending messages between members of the digital social network.

Input dictionaries may be used by computer applications to speed up the selection of a word or group of words. The input dictionary is comprised of a plurality of textual words or terms stored in a data structure that is searchable, such as via textual matching or the like. For example, input dictionaries are often used in applications in which the user is inputting words through a user interface other than the conventional keyboard, e.g., a device using voice recognition input or a cellular telephone using Text on 9 keys (T9) input. With voice recognition, audio input waveforms are used with a trained software algorithm to recognize words spoken by a user based on the user's voice pattern. U.S. Pat. No. 6,973,427 issued to Hwang et al. describes an example system in which voice recognition is utilized with text based dictionary matching.

T9 input is a predictive text technology for mobile or cellular telephones that attempts to make it easier to type text messages on small mobile devices. The technology allows words to be entered by a single key press for each letter, as opposed to the approach used in older generation mobile devices in which several letters are associated with each key and selecting one letter often requires multiple key presses. The software combines the groups of letters found on each phone key with a fast access input dictionary of words. It looks up all the possible words corresponding to the sequence of key presses in the dictionary. As the predictive software gains familiarity with the words and phrases the user commonly uses, it speeds the process by offering the most frequently used words first and then lets the user access other choices with one or more presses of a predefined "Next" key.

Whether using voice recognition, T9 input, or any other technology that is based on input dictionary matching operations, when a user enters a word or portion of a word as input, such as by speaking or keying in characters, the software that ultimately decides on the right word to be used, utilizes the inputted word or portion of a word as a key. The key is then used as a lookup index into the input dictionary to attempt to find the correct word that should be used as an output value. In this sense, the software attempts to find the closest match to the inputted word. As a result, the input dictionary on the backend must be as large as possible in order to improve the accuracy of the matching operation.

However, in devices that utilize these types of input devices, i.e. voice recognition and T9 input, storage space and processing speed may be limited. That is, the devices where these input devices are used tend to be mobile electronics which, due to size and cost, have limited storage space available to store input dictionaries and limited processing ability to perform such input dictionary lookup operations.

Moreover, in known devices/systems that utilize input dictionaries, the input dictionaries are generally the same for all users of the devices/systems. That is, all purchasers of a particular mobile telephone will be provided with the same input dictionary regardless of who they are. In some cases, these input dictionaries may be trained to include additional words or terms entered by the particular user, such as in the case of U.S. Pat. No. 6,973,427. However, the input dictionary must be specifically trained or augmented by the user of the device in order to become customized to the words and terms used by the user. Moreover, the ability to increase the size of the input dictionary by user input does not address the storage space and processing limitations previously discussed.

SUMMARY

The illustrative embodiments provide a system and method for providing a social network aware input dictionary. With the mechanisms of the illustrative embodiments, a social network of users is monitored to determine the words and terms utilized by the users as part of their communication and interaction within the social network. Words and terms are ranked, or prioritized, within the social network based on a determined increase/decrease in popularity of the words/terms as determined from the monitoring of the social network. Based on the ranking of these words/terms, individual input dictionaries associated with devices used by the users of the social network may be automatically updated to include/remove these words/terms and/or increase/decrease a relative priority of the words/terms within the input dictionaries. Such automatic updating may be performed regardless of whether the particular user has used the word/term or not.

In addition to updating input dictionaries of individual members of a social network, the input dictionaries may be dynamically modified based on the particular individuals with whom communication is being performed. For example, if the target of the communication is part of the social network, then words/terms that have been determined to be highly used in the social network may be included in the input dictionary utilized with the particular communication being performed. However, if the target of the communication is not part of the social network, then such words/terms may be excluded from the input dictionary in order to avoid the possibility of using words/terms not recognizable, or which may be misinterpreted, by individuals or organizations outside the social network.

This mechanism may be extended to customization of the communication for a plurality of recipients based on whether the recipients are part of the social network or not. That is, words/terms that are designated as being a high priority word/term within the social network may be excluded from communications being sent to recipients that are not part of the social network and may be included in communications sent to recipients that are part of the social network. In this way, the same communication may have different forms depending on the recipients to which it is sent. A user may generate the communication with words/terms used within the social network and have those terms automatically excluded from, or replaced in, the communication when it is sent to recipients that are not part of the social network.

In one illustrative embodiment, a method for communication within a digital social network using a social network input dictionary is provided. The method may comprise monitoring communications within the digital social network to identify a term used by one or more members of the digital social network, the digital social network being a plurality of members who are associated with one another via one of a centralized or distributed digital social network provider system. The method may further comprise measuring a usage of the term by the one or more members of the digital social network, determining if the term is present in a social network input dictionary for the digital social network, and determining if the measured usage of the term by the one or more members of the digital social network meets a criteria for addition of the term to the social network input dictionary. The method may also comprise adding the term to the social network input dictionary for the digital social network if the term is not already present in the social network input dictionary and the measured usage of the term meets the criteria and utilizing the social network input dictionary to generate textual representations of messages input by one or more of the members of the digital social network.

The term may be a term specific to the digital social network that is not generally known to persons outside of the digital social network. The criteria for addition of the term to the social network input dictionary may be a frequency of use within a predetermined period of time.

The social network input dictionary may be a centralized social network input dictionary. The method may further comprise distributing an update of local versions of the social network input dictionary to data processing devices associated with the plurality of members of the digital social network based on the current state of the centralized social network input dictionary at the time of the update, each data processing device associated with the plurality of members having its own local version of the social network input dictionary. The update of the local versions of the social network input dictionary may be distributed either periodically or in response to a change in the centralized social network input dictionary.

The social network input dictionary may be local to a data processing device associated with one member of the plurality of members. The method may further comprise distributing, from the data processing device associated with the one member to data processing devices associated with the other members of the plurality of members, an update of local versions of the social network input dictionary, each data processing device associated with the plurality of members having its own local version of the social network input dictionary.

Moreover, the method may comprise updating usage information for the term in the social network input dictionary if the term is determined to be already present in the social network input dictionary and adjusting a relative ranking of the term within the social network input dictionary based on the updated usage information. Furthermore, the method may comprise monitoring the social network input dictionary to determine if one or more terms in the social network input dictionary have a current usage metric that meets a threshold indicative of declining use of the term in communications within the digital social network. A relative priority of the one or more terms in the social network input dictionary may be reduced if the current usage metric meets the threshold. The method may also comprise determining if the usage metric or relative priority of the one or more terms in the social network input dictionary meets criteria for removal of the one or more terms from the social network input dictionary. An entry in the social network input dictionary associated with the one or more terms may be deleted if an associated usage metric or relative priority of the one or more terms meet the criteria for removal.

Utilizing the social network input dictionary to generate textual representations of messages input by one or more of the members of the digital social network may comprise using the term to generate a textual representation of a message input by a member of the digital social network that has not previously used the term in a communication within the digital social network. Moreover, utilizing the social network input dictionary to generate textual representations of messages input by one or more of the members of the digital social network may comprise receiving user input from a member of the plurality of members, the user input specifying a message to be communicated to a recipient, comparing the user input to the social network input dictionary to match portions of the user input to terms in the social network input dictionary, and using the matched terms to generate a textual representation of the user input.

The social network input dictionary may comprise general terms and digital social network specific terms. Utilizing the social network input dictionary may further comprise identifying the recipient of the message to be communicated and determining if the recipient is a member of the plurality of members of the digital social network. Comparing the user input to the social network input dictionary may comprise using only general terms for matching with portions of the user input if the recipient is not a member of the plurality of members of the digital social network and using both the general terms and the digital social network specific terms for matching with portions of the user input if the recipient is not a member of the plurality of members of the digital social network.

The message may be directed to a plurality of recipients. The identifying of the recipient, determining if the recipient is a member, comparing the user input to the social network input dictionary, and using the matched terms to generate the textual representation of the user input may be performed for each recipient of the plurality of recipients. At least one first recipient of the plurality of recipients may be a member of the plurality of members and at least one second recipient of the plurality of recipients may not be a member of the plurality of members. Using the matched terms to generate the textual representation of the user input may result in a textual representation for the at least one first recipient that is different from the at least one second recipient.

The communications that are monitored may be communications between mobile electronic devices used by the plurality of members. The mobile electronic devices may be wireless communication devices. The social network input dictionary may be utilized to generate textual representations of messages input by the one or more members using a Text on 9 keys (T9) input interface of the wireless communication devices. The social network input dictionary may be utilized to generate textual representations of message input by the one or more members using a voice recognition input interface of the wireless communication devices. The social network input dictionary may have a first portion in which entries for general terms are stored and a second portion in which entries for digital social network specific terms are stored. Moreover, in some illustrative embodiments, only the second portion may be updated by the addition of terms identified in communications within the digital social network or by the updating of usage information for terms identified in communications within the digital social network.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

The illustrative embodiments provide a system and method for providing a social network aware input dictionary. The social network aware input dictionary may be used to aid individuals with the input of communications to data processing devices for transmission to other individuals via their respective data processing devices. The social network aware input dictionary may be used to match a word/term or a portion of a word/term to an entry in the social network aware input dictionary in order to aid in the input of such words/terms in the communication. Such matching may be performed for the purposes of predicting the entry of a word/term (hereafter referred to as a "term"), finding a corresponding term used within the social network, or the like. Because the illustrative embodiments are directed to mechanisms for aiding the communication between individuals using data processing devices, the mechanisms of the illustrative embodiments are especially well suited for use with a distributed data processing system.

Figure 1:
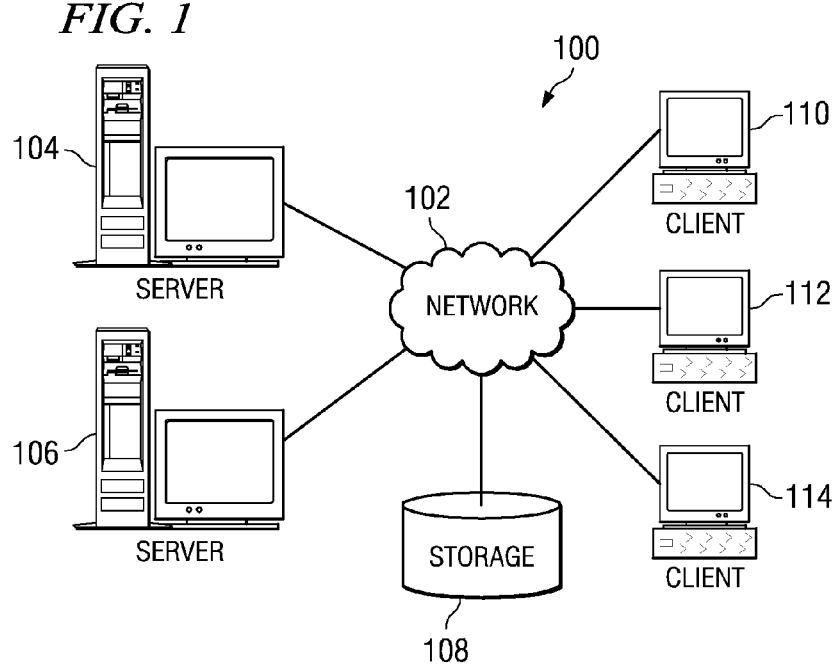
FIG. 1 is an exemplary representation of an exemplary distributed data processing system in which aspects of the illustrative embodiments may be implemented.
Figure 2:
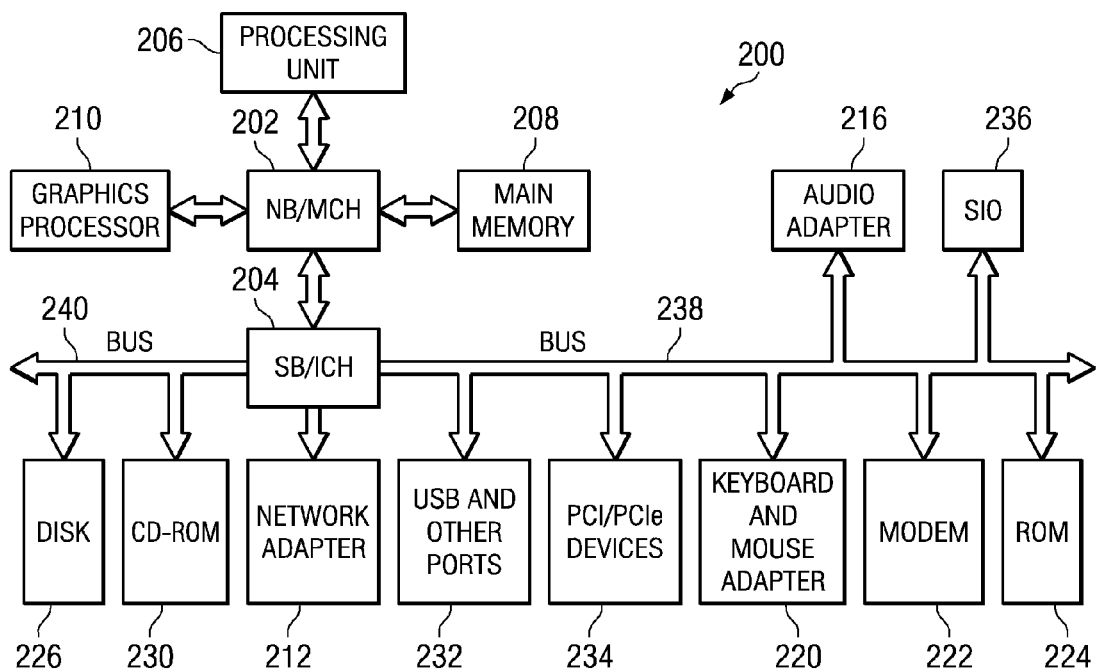
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like.

As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Returning again to FIG. 1, client devices 110, 112, and 114 may be associated with a digital social network, i.e. a group of users that have a common interest or goal and whom have registered identifiers (e.g., electronic addresses or the like) that are grouped together. Digital social networks may be established in many different ways including formal registry with a digital social network provider, e.g., a website, chat or news group, or the like, or less formal registry, e.g., contacts listing in an electronic mail (email) or instant messaging client device, distribution group in an email or instant messaging client device. Moreover, digital social networks may be established in an ad hoc manner, built utilizing a "degree of separation" algorithm to determine a group from a predefined level of closeness to a user. As such, the members of a digital social network communicate with one another via the client devices 110, 112, and 114 and the network 102. Such communication may be in the form of textual messages transmitted as data packets across the network 102, for example. While the messages may be textual in nature during transmission across the network 102, the input/output of the messages at the end client devices 110, 112, and 114, may be in any media format including textual, graphical, audio, video, any combination of these media types, or the like. For example, the messages may be input via voice input at a source client device 110, converted to textual representations for transmission across the network 102, and then converted back to an audio output at the recipient client device 114. Alternatively, the messages may be entered as text at a source client device 110, such as via a keyboard, T9 input device, or the like, transmitted as text messages packaged in data packets across the network 102, and then output as text at the recipient client device 112. Any combination of input/output and transmission media types may be used without departing from the spirit and scope of the present invention.

The illustrative embodiments provide a mechanism for monitoring such communications so as to dynamically update input dictionaries associated with the client devices 110, 112, and 114 of the individuals that are members of a digital social network. The monitoring and updating of such input dictionaries may be performed in a customized manner such that an input dictionary for one digital social network may be different than an input dictionary for another digital social network. Through the monitoring, terms that are specifically used by the members of the digital social network may be used to update input dictionaries for members of the digital social network regardless of whether that particular member has used the term himself or herself.

For example, assume a first user, named "Liz," is a high school student who is a member of a digital social network with 12 of her friends. She and her 12 friends use a client device that allows them to speak a short voice message and have the client device convert the voice message into a text message and send it to someone via a standard text messaging mechanism. Such voice messaging may comprise taking each spoken word input waveform or pattern and comparing it to similar patterns stored in memory to determine a textual representation of the spoken word. The textual representation may then be used to perform a lookup in an input dictionary, such as the social network input dictionary of the illustrative embodiments, to thereby generate a textual representation of the spoken word.

Alternatively, Liz may enter a textual message, such as via a T9 interface, keyboard, or the like, and have that message sent to another member of the digital social network via a text messaging mechanism. While Liz is entering the textual message, suggestions as to the words/terms she is typing may be displayed to aid her in quickly composing the message. These words/terms may be identified from an input dictionary, such as the social network input dictionary of the illustrative embodiments, by comparing the characters entered by Liz with a prioritized listing of terms in the input dictionary having a similar pattern of characters.

It should be appreciated that while Liz is composing messages and exchanging them with her friends, her 12 friends are also composing messages and exchanging them with Liz and amongst each other. During these communications, some of Liz's friends start to use a new term, e.g., the term "kvetchin." That is, the term "kvetchin" has been used by a few of her friends while they send these communications to each other, although the term may not have yet been used by Liz herself. The social network provider system that provides a communication pathway between members of Liz's digital social network may monitor the communications passing between the members of Liz's digital social network and identify the new term "kvetchin" as one that should be added to the input dictionaries of the members of the digital social network. The social network provider system, rather than being a centralized server, may be distributed across each of the client devices of the members of the digital social network such that each individual client device may perform such monitoring of communications with regard to the individual client device and communicate updates to each of the other members' client devices within the digital social network.

Based on the detection of the new term "kvetchin," the social network provider system, or the client devices, may determine to add the term to the social network input dictionaries of the client devices of the members of the digital social network. Such a determination may be made, for example, based on a frequency of use determination, i.e. determining that the term has been used more than a threshold number of times within a given period, for example. As a result, the term "kvetchin" may be added to the social network input dictionaries of each of the member's client devices and thereafter used with communications to and from these client devices.

For example, some days later after the term "kvetchin" has been added to the social network input dictionary of Liz's client device, Liz may use the term for the first time in a communication by speaking the term while inputting a message. Since the term "kvetchin" is in the social network input dictionary, when Liz speaks the term, the input voice pattern is matched to a set of characters which are then used to lookup the term "kvetchin" within the social network input dictionary. As a result, the term "kvetchin" is included in the resulting text message that is transmitted from Liz's client device to the recipients' client device.

Without the social network monitoring and updating of an input dictionary afforded by the mechanisms of the illustrative embodiments, the term "kvetchin" would not have been included in the input dictionaries of the client devices and thus, when Liz spoke the term, it would have been unrecognizable and a corresponding match would either not have been found or an incorrect match would have been determined. In known input dictionary based mechanisms, the input dictionary is either static, i.e. not updateable, or requires specific updates by the user, e.g., a specific command to add a particular term to the input dictionary. There is no mechanism currently available for automatically monitoring the social network of a user and the terms being used within that social network to automatically update a user's input dictionary.

To continue the example above, as the social network continues to be monitored by the mechanisms of the illustrative embodiments, the popularity of the terms in the social network input dictionary are continued to be monitored to determine relative priorities of terms as well as if any of the terms need to be removed. That is, as the frequency of use of a term increases within the digital social network, the priority of the term may be increased in a prioritized listing of such terms. In this way, the most likely match of an input term may be identified based on the terms that are currently most prevalently used within the digital social network. Moreover, as a term is used less frequently within the digital social network, the priority of the term may be decreased in a prioritized listing of the terms. Once the priority of the term falls below a certain threshold, that term may be removed from the social network input dictionary altogether.

For example, as the term "kvetchin" increases in popularity, if Liz were to speak or input a term that is recognized as "svetch," the likelihood is that the recognized term will be matched to the term "kvetchin." However, as the term "kvetchin" wanes in popularity, the likelihood that the recognized term is matched to the term "kvetchin" is decreased. Instead, the term "svetch" may be matched with the term "sketch" instead of the suddenly unpopular term "kvetchin." Thus, the social network input dictionary of the illustrative embodiments may be dynamically updated based on the continued monitoring of communications between members of the social network and the frequency of use of the terms in these communications.

Figure 3:
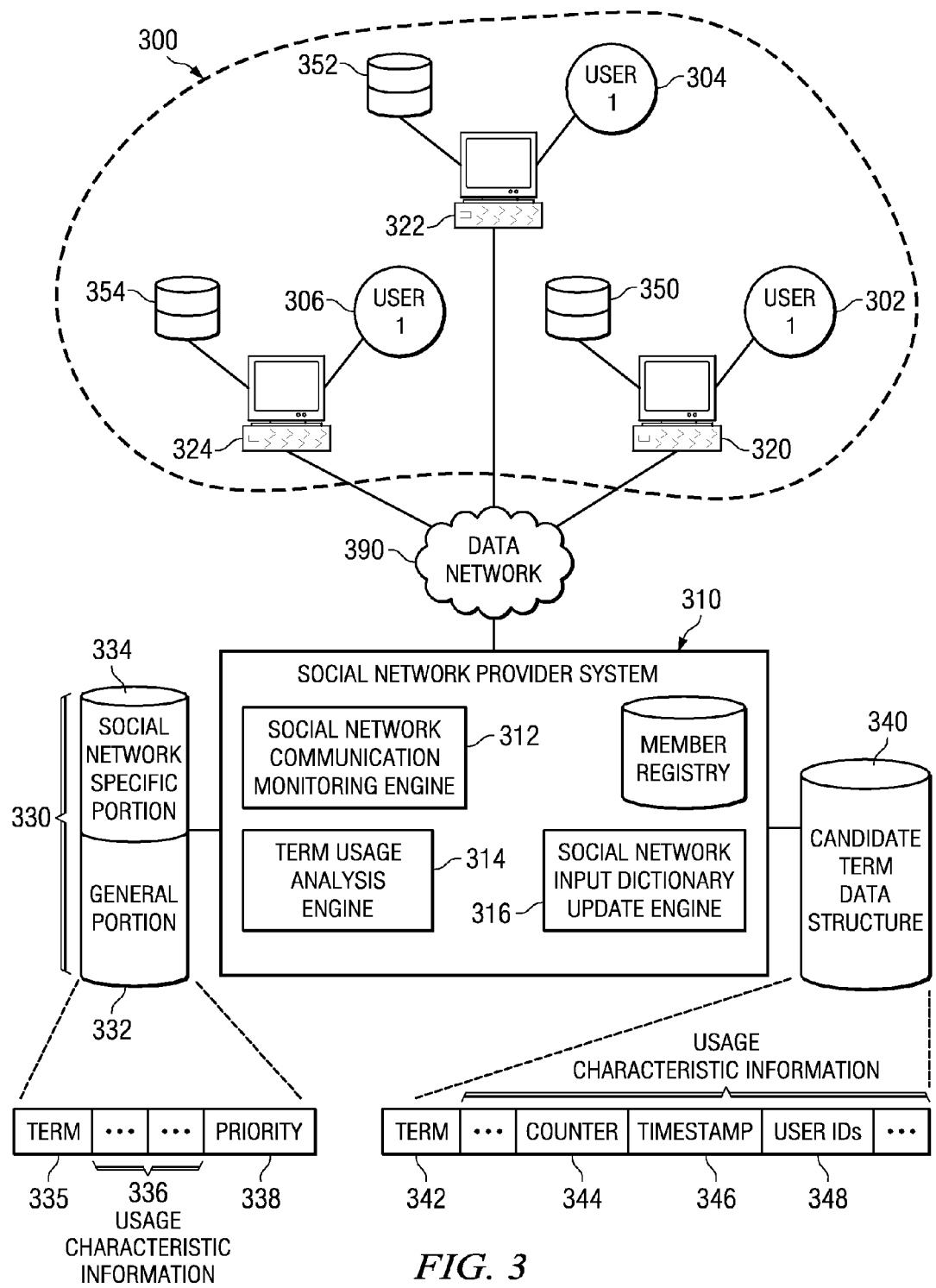
FIG. 3 is an exemplary diagram illustrating an operation of a social network input dictionary mechanism in accordance with one illustrative embodiment.

FIG. 3 is an exemplary diagram illustrating an operation of a social network input dictionary mechanism in accordance with one illustrative embodiment. With the mechanisms of the illustrative embodiments, members 302-306 of a digital social network 300 register with a social network provider system 310, which may be provided as part of an association with a server 104 in FIG. 1, for example. The social network provider system 310 provides a mechanism through which members 302-306 are able to identify other members 302-306 of the same digital social network 300 if desired, may provide a transmission intermediary through which communications may be provided to members 302-306 of the digital social network 300, and provide monitoring and update functionality in accordance with the illustrative embodiments. It should be appreciated that rather than having a centralized social network provider system 310 such as described above, the social network provider system 310 may be distributed across a plurality of data processing devices, such as a plurality of servers, or even across a plurality of end client devices. For example, the functionality described hereafter as being attributed to a centralized social network provider system 310 may in fact be distributed to the client devices 320, 322, and 324, such as via software and/or hardware mechanisms provided in, or coupled to, the client devices 320, 322, and 324.

The social network provider system 310 may maintain a social network input dictionary data structure 330 that stores the terms detected as being used by the members 302-306 of the digital social network 300 with which client devices 320, 322, and 324 are associated. It should be appreciated that in some illustrative embodiments, the social network provider system 310 may support and monitor a plurality of digital social networks rather than just a single digital social network 300, or may be dedicated to a single digital social network 300. In the case where multiple digital social networks are being supported and monitored, separate social network input dictionary data structures may be established for each of the digital social networks being supported and monitored. In this way, terms particular to each of the digital social networks may be maintained and monitored separately from terms used by other digital social networks.

It should be appreciated that the social network input dictionary 330 may maintain not only terms that are particular to the digital social network 300 but also general terms as well. The general terms may be maintained in a separate general portion 332, or otherwise in a separately identifiable manner, e.g., via a tag or field value, in the social network input dictionary data structure 330. The general terms portion 332 of the social network input dictionary 330 may be maintained relatively statically such that it is very rarely, if ever, updated to add and/or remove terms. The social network specific portion 334 of the social network input dictionary 330 may be dynamically updated based on monitoring of the communications between individuals within the digital social network 300, as discussed in greater detail hereafter.

The social network provider system 310 monitors communications flowing through it between members 302-306 of the digital social network 300. For example, a user of a first client device 320 may send a message to a user of a second client device 324, the message having a plurality of terms provided therein. As mentioned above, the input of the message may be in any format including voice input, textual input, or the like, which can be converted to a textual representation that is transmitted as data across a data network 390. The messages, in one illustrative embodiment, are sent from the first client device 320 to the social network provider system 310 via the data network 390, and then forwarded to the second client device 324. Thus, when the social network provider system 310 receives the messages, it is able to temporarily, or permanently, store a copy of the messages for analysis and monitoring purposes. The terms in this copy of the message may be analyzed to determine if there are any new terms that need to be added to the social network input dictionary 330 for the digital social network 300.

The social network provider system 310 may comprise a social network communication monitoring engine 312, a term usage analysis engine 314, and an automatic social network input dictionary update engine 316. These engines 312-316 may comprise logic, provided in software, hardware, or any combination of software and hardware, for monitoring and analyzing the usage of terms in communications within the digital social network 300 and for automatically updating social network input dictionaries of the digital social network 300. For example, the social network communication monitoring engine 312 comprises logic for monitoring communications to/from members 302-306 of the digital social network 300 and identifying terms used within these communications. The term usage analysis engine 314 comprises logic for monitoring the manner by which terms are used in communications to thereby monitor the rise and fall in popularity of terms within the digital social network 300. The automatic social network input dictionary update engine 316 comprises logic for updating a social network input dictionary based on the detected terms used in communications within the digital social network 300, as determined by the social network communication monitoring engine 312, and the determined usage of these terms as determined by the term usage analysis engine 314.

The analysis and monitoring of terms performed by the social network provider system 310 may be performed in many different ways. In one illustrative embodiment, messages may be first analyzed to determine if they are communications between members 302-306 of the digital social network 300. If at least one of the parties in the communication, i.e. the sender or the receiver of a message, is determined to be a member 302-306 of the digital social network 300, further monitoring and analysis of the messages may be performed as described hereafter. If none of the parties to the communication are members 302-306 of the digital social network 300, then such monitoring and analysis may not be performed.

With messages being passed to/from at least one member 302-306 of the digital social network 300, the terms in a message may be compared against the current version of the social network input dictionary 330 to determine if any new terms are being utilized. This comparison may first compare the terms against the general portion 332 of the social network input dictionary 330 to determine if the terms are general in nature. If there is a match, no further processing of that term is necessary. If there is not a match, then the term may be compared against terms in the social network specific portion 334 of the social network input dictionary 330 to determine if the term is already part of the social network specific portion 334 of the social network input dictionary 330. If it is already part of the social network specific portion 334 of the social network input dictionary 330, then usage characteristic information is updated for that term based on the currently detected usage of the term, as discussed hereafter.

If it is not already part of the social network specific portion 334 of the social network input dictionary 330, then it is determined if the term is already flagged as a candidate for inclusion in the social network specific portion 334 of the social network input dictionary 330. This determination may be made based on comparing the term to terms in a candidate term data structure 340 maintained by the social network provider system 310. This candidate term data structure 340 stores the terms and their usage characteristics for terms that are being considered for inclusion in the social network input dictionary 330. Once a term in the candidate term data structure 340 meets certain inclusion criteria, the term may be added to the social network specific portion 334 of the social network input dictionary 330.

For example, if a term is detected in a communication within the digital social network 300, and that term is determined to not be in either the general portion 332 or the social network specific portion 334 of the social network input dictionary 330, then the term is compared to the candidate term data structure 340. If it is determined that the term is not in the candidate term data structure 340, through a text word matching comparison or the like, then the term may be added to a term field 342 in the candidate term data structure 340 and a frequency of use counter 344 associated with the entry may be incremented. A timestamp 346 of a last use of the term may also be stored in a field associated with the term, this field representing the last time the term was detected in a communication from any of the members 302-306 of the digital social network 300. Other usage characteristic information may also be maintained in the candidate term data structure 340, such as identifiers 348 of members 302-306 that have used the term, relative number of times each member 302-306 has used the term, and any other usage characteristic information that may be useful in determining whether to include the term in the social network input dictionary 330 or not. If the term is already in the candidate term data structure 340, the usage characteristic information may be updated for the corresponding entry in the candidate term data structure 340 based on the current detected usage of the term in the monitored and analyzed communication.

The entries in the candidate term data structure 340 are analyzed to determine if their usage criteria meets a predetermined threshold for addition of the corresponding term in the social network input dictionary 330. Such analysis may be performed periodically, in response to an update to an entry in the candidate term data structure 340, in response to a user request, or the like. For example, the threshold may specify that if a term is used with a particular frequency, i.e. more than a predetermined number of times within a specified period, by the members 302-306 of the digital social network 300, then the term should be added to the social network specific portion 334 of social network input dictionary 330.

In response to a determination that the term should be added to the social network input dictionary 330, an entry in the social network input dictionary 330 is added having a field 335 for specifying the term and one or more fields 336 tracking usage characteristic information. The fields 336 may be updated as the corresponding term is recognized in communications occurring between members 302-306 of the digital social network 300 to track the usage of the corresponding term over time within the digital social network 300. The entries in the social network input dictionary 330 may further include a field 338 for identifying a relative priority of the term with regard to other similar terms in the social network input dictionary 330. The range of priorities may span all of the terms in the social network input dictionary 330 or a subset of the terms. For example, a first set of priorities may be associated with only terms in the social network specific portion 334 of the social network input dictionary 330 with separate priority ranges for terms beginning with each letter of the alphabet. Thus, all terms in the social network specific portion 334 beginning with the letter "T" may be prioritized relative to each other using this priority field 338. Alternatively, all the terms in the social network specific portion 334 may be prioritized with regard to each other using this field 338. The priority field 338 may be used to select between two or more terms that match an input from a user so as to provide the most likely match based on previous usage.

This priority field 338, or the usage characteristic information fields 336, may be used to determine if and when to remove a term from the social network input dictionary 330. For example, the social network input dictionary 330 may periodically, or in response to an event or input from a user, analyze the entries in the social network input dictionary 330 to determine if the usage of the term within the digital social network 300 has waned. If the usage characteristic information in the fields 336, or the priority in priority field 338, meets a predetermined threshold, then the corresponding term may be deleted from the social network input dictionary 330. In this way, through the monitoring of the communications in the digital social network 300, comparison of terms to the social network input dictionary 330, maintaining and analysis of entries in the candidate term data structure 340, and the analysis of entries in the social network input dictionary 330, an input dictionary that is customized for the particular digital social network 300 is obtained and maintained up-to-date with regard to the popularity of terms being used within the digital social network 300.

The social network input dictionary 330 may be used to update local versions of the social network input dictionary 350-354 associated with each of the client devices 320-324. Such an update may be performed periodically or in response to an event or user request, for example. The social network provider system 310 may push updates across the data network 390 to the client devices 320-324. Alternatively, individual client devices 320-324 may pull the updates from the social network provider system 310 by way of submitting requests for the updates in response to an event, a periodic schedule, a user input, or the like. In this way, the local versions 350-354 of the social network input dictionary 330 may be maintained consistent with the centralized version of the social network input dictionary 330.

As mentioned above, rather than using a centralized mechanism as described above, the mechanisms of the illustrative embodiments may be distributed across a plurality of data processing devices. For example, in one illustrative embodiment, the mechanisms may be distributed to each of the client devices 320-324 such that each client device 320-324 performs the operations described above with regard to its own local copy of the social network input dictionary 350-354. In such a case, the monitoring of communications may be performed with regard to only the communications to and from the particular client devices 320-324. When updates are performed to a local copy of the social network input dictionary 350-354, these updates may be replicated on each of the other local social network input dictionaries 350-354 by the client device 320-324 sharing the updates with the other client devices 320-324. That is, the updates may be communicated through data transfers to each of the other client devices 320-324 such that each of the local social network input dictionaries 350-354 are maintained consistent with each other.

Figure 4:
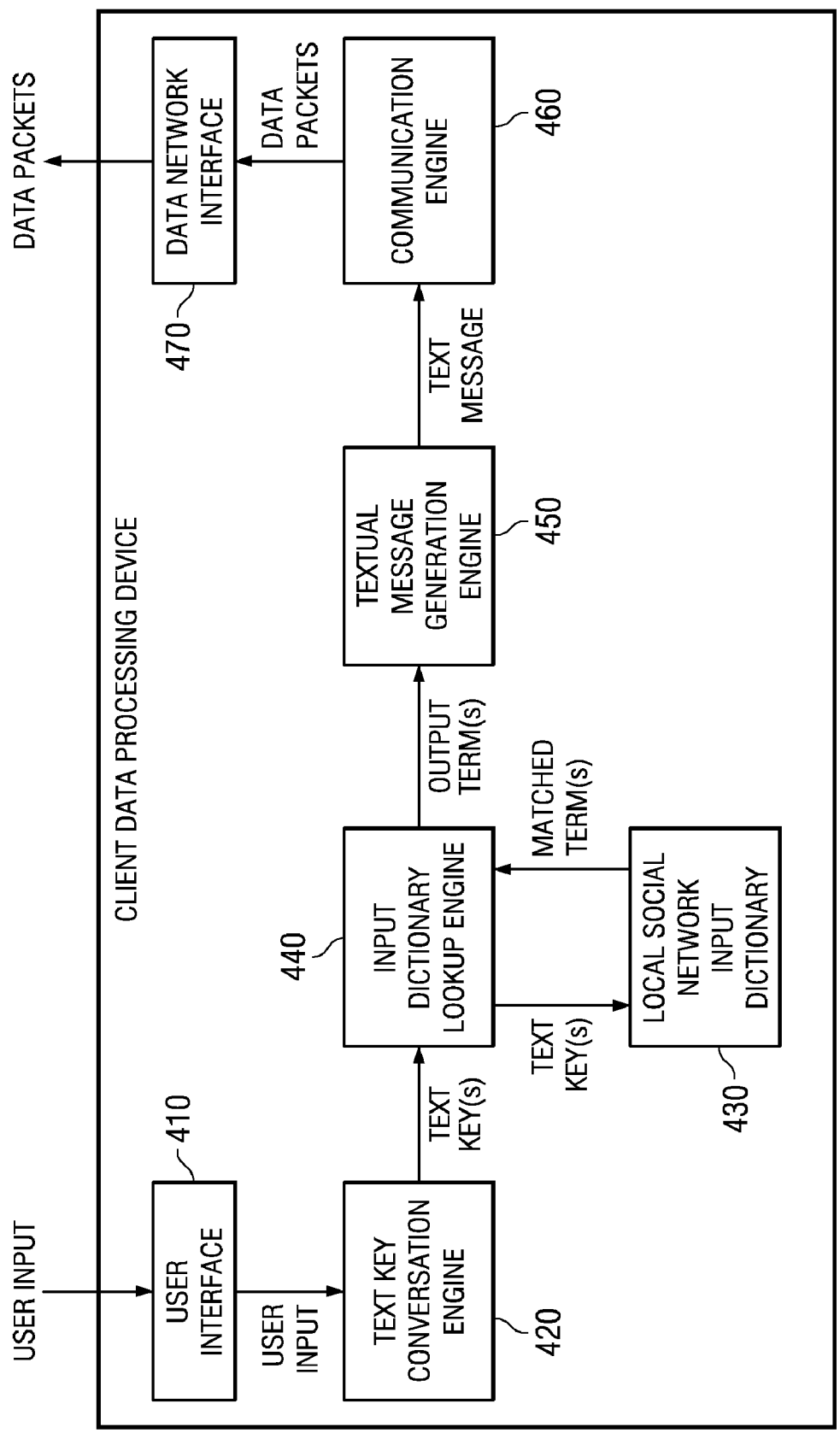
FIG. 4 is an exemplary diagram illustrating the use of a social network input dictionary by an end user in accordance with one illustrative embodiment.

The local copies of the social network input dictionaries 330 are used to either convert voice input to a textual representation for transmission across the data network 390, provide predictive text for messages input by a user, or otherwise provide a mechanism for matching terms in the social network input dictionary 330 to input from a user. FIG. 4 is an exemplary diagram illustrating the use of a social network input dictionary by an end user in accordance with one illustrative embodiment. The elements in FIG. 4 may be implemented as software, hardware, or any combination of software and hardware in a data processing device, such as a client device 320-324 in FIG. 3, for example.

As shown in FIG. 4, a user may input an initial message via the user interface 410. This user interface 410 may be a voice input device, such as a microphone or the like, a keyboard, such as a QWERTY keyboard, a keypad, such as a T9 keypad, or the like. The input received via the user input device 410 is provided to a text key conversion engine 420 which converts the user input to one or more text keys that are to be used to perform a term matching operation using the local social network input dictionary 430. The text key(s) are then used by the input dictionary lookup engine 440 to perform a term matching operation by comparing the text key(s) to entries in the local social network input dictionary 430. For a particular text key, if there is a single match of the text key to a term in the local social network input dictionary 430, then that term is returned as the matching term for the text key. If there is more than one potential match, then the usage characteristic information and/or the priority information associated with the entries in the local social network input dictionary 430 are used to determine which term to return as a match for the text key. For example, a highest priority term, most recently used term, most often used term, or the like, may be selected from amongst the potential matches as the term to return as a match for the text key.

The matched terms are returned to a textual message generation engine 450 which composes the textual message matching the user input based on the identified matches in the local social network input dictionary 430. The textual message generation engine 450 provides the resulting textual message to a communication engine 460 which communicates the textual message over the data network via data network interface 470. Thus, from a user input, a corresponding textual message matching the user input is generated based on a local social network input dictionary 430 that is aware of the terms currently being utilized by members of the digital social network.

The above mechanisms may be further enhanced by adjusting the text key matching operation based on the intended recipient of the user's input message. That is, the user, when inputting a message, identifies an intended recipient of the message either by speaking or otherwise inputting an identifier of the intended recipient, e.g., an address, name, or the like, of the recipient. If the recipient of the message is part of the digital social network, then terms that have been determined to be highly used in the digital social network may be included when performing the text key matching operation. That is, the social network specific portion of the social network input dictionary may be included as part of the social network input dictionary when performing the text key matching operation.

However, if the recipient of the message is not part of the digital social network, then such terms may be excluded from the text key matching operation in order to avoid the possibility of using terms not recognizable, or which may be misinterpreted, by individuals or organizations outside the digital social network. Thus, the social network specific portion of the social network input dictionary may be excluded as part of the social network input dictionary when performing the text key matching operation. In other words, only the general portion of the social network input dictionary is used to perform the text key matching operation.

This mechanism may be extended to customization of the message for a plurality of recipients based on whether the recipients are part of the digital social network or not. That is, terms that are designated as being a high priority term within the digital social network, and thus are part of the social network specific portion of the social network input dictionary, may be excluded from messages being sent to recipients that are not part of the digital social network and may be included in messages sent to recipients that are part of the digital social network. In this way, the same message may have different forms depending on the recipients to which it is sent. A user may generate the message with terms used within the digital social network and have those terms automatically excluded from, or replaced in, the message when it is sent to recipients that are not part of the social network. In this way, a message may be composed once, having a plurality of recipients specified some of which are part of the digital social network and some which are not, and have the message automatically modified for the recipients based on whether or not they are part of the digital social network or not.

Thus, as described above, the illustrative embodiments provide a system and method for providing a social network aware input dictionary. With the mechanisms of the illustrative embodiments, a social network of users is monitored to determine the words and terms utilized by the users as part of their communication and interaction within the social network. Words and terms are ranked, or prioritized, within the social network based on a determined increase/decrease in popularity of the words/terms as determined from the monitoring of the social network. Based on the ranking of these terms, individual input dictionaries associated with devices used by the users of the social network may be automatically updated to include/remove these terms and/or increase/decrease a relative priority of the terms within the input dictionaries. Such automatic updating may be performed regardless of whether the particular user has used the word/term or not. Moreover, the use of the input dictionaries may be modified based on the intended recipient(s) of the communications, i.e. whether they are or are not part of the digital social network.

Figure 5:
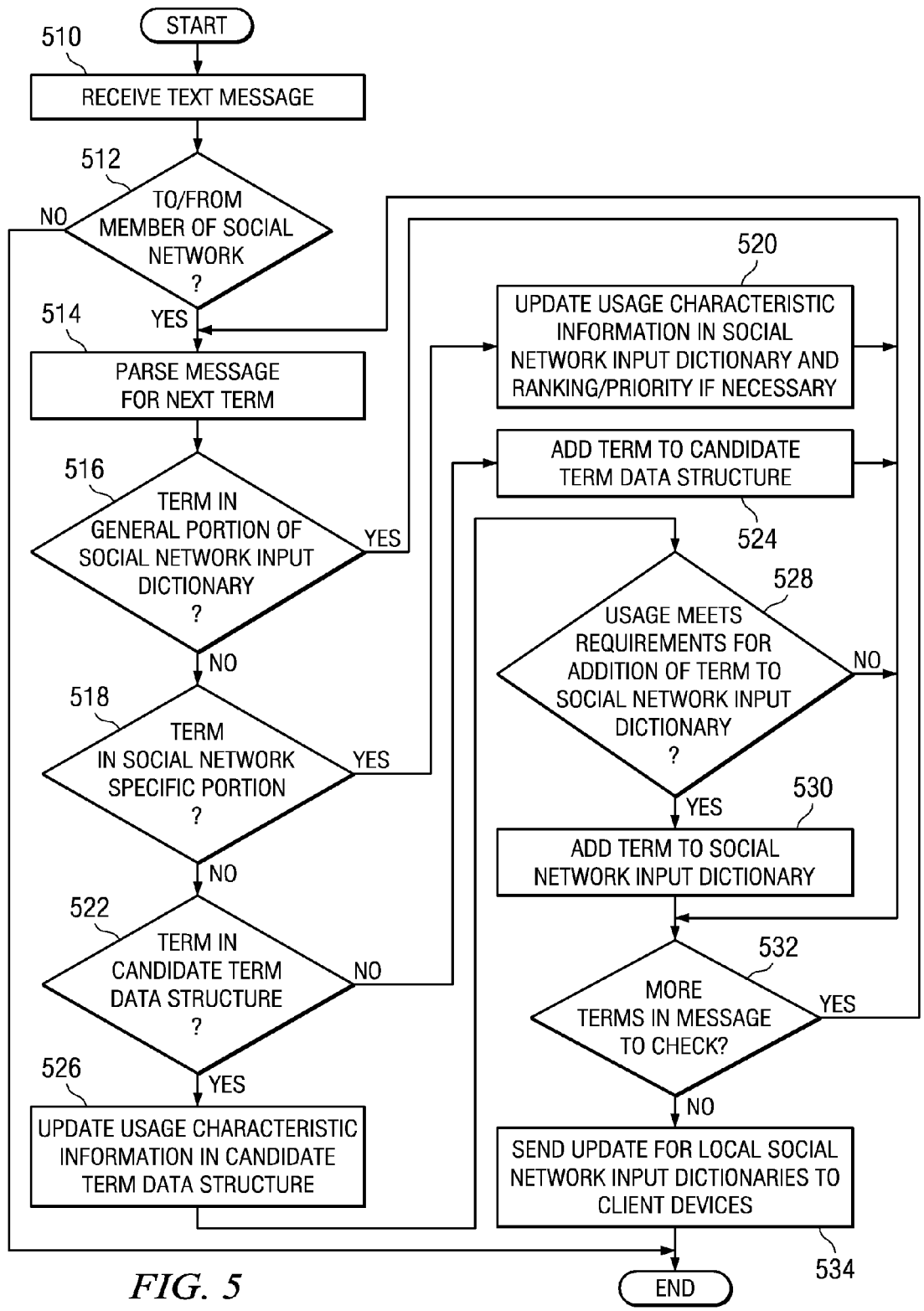
FIG. 5 is a flowchart outlining an exemplary operation for monitoring and dynamically updating a social network input dictionary in accordance with one illustrative embodiment.
Figure 6:
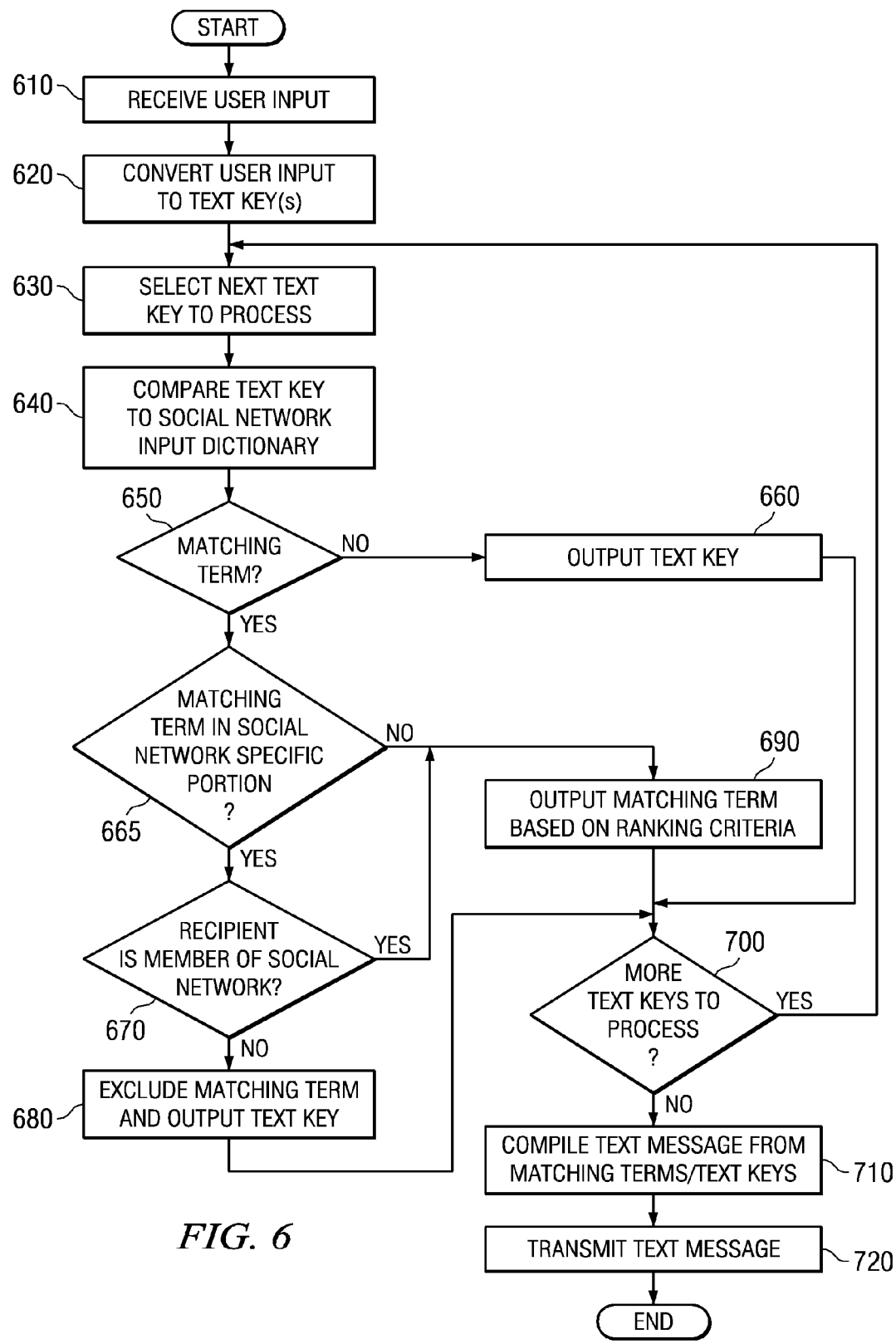
FIG. 6 is a flowchart outlining an exemplary operation for generating a communication using a social network input dictionary in accordance with one illustrative embodiment.

FIGS. 5 and 6 are flowcharts that illustrate exemplary operations of one illustrative embodiment of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 5 is a flowchart outlining an exemplary operation for monitoring and dynamically updating a social network input dictionary in accordance with one illustrative embodiment. The operation outlined in FIG. 5 may be performed, for example, by a social network input dictionary system, such as a social network provider system or client device having the mechanisms of the illustrative embodiments. As shown in FIG. 5, the operation starts with the social network input dictionary system receiving a text message (step 510). The text message is analyzed to determine if the message is to, from, or to and from a member of the social network (step 512). If the message is neither to nor from a member of the social network, the operation terminates. If the message is either to or from a member of the social network, or both, the text message is parsed for the next term in the text message (step 514).

A determination is made as to whether the term is in the general portion of the social network input dictionary for the social network (step 516). If so, the operation continues to step 532 which is described hereafter. If the term is not in the general portion of the social network input dictionary, a determination is made as to whether the term is in the social network specific portion of the social network input dictionary (step 518). If the term is in the social network specific portion of the social network input dictionary, the usage characteristic information for that term is updated in the social network input dictionary based on the current usage of the term in the text message and the ranking/priority of the term is adjusted if necessary (step 520).

If the term is not in the social network specific portion of the social network input dictionary, a determination is made as to whether the term is already in the candidate term data structure (step 522). If the term is not already in the candidate term data structure, the term is added to the candidate term data structure and its usage characteristic information is appropriately set based on the current usage of the term in the text message (step 524). Thereafter, the operation continues to step 532 discussed hereafter.

If the term is already in the candidate term data structure, the usage characteristic information for the term in the candidate term data structure is updated based on the current usage of the term in the text message (step 526). A determination is made as to whether the usage characteristic information for the term in the candidate term data structure meets criteria for adding the term to the social network input dictionary (step 528). If so, the term is added to the social network input dictionary along with the characteristic information for that term as obtained from the candidate term data structure (step 530). Thereafter, or if the term is not to be added to the social network input dictionary, a determination is made as to whether there are more terms in the text message that need to be checked (step 532). If so, the operation returns to step 514 and the process is repeated for the next term in the text message.

If there are no more terms to be checked in the text message, i.e. the end of the message has been reached, then updates of the local copies of the social network input dictionaries may be sent to the client devices (step 534). As discussed above, this may be done with each update to the social network input dictionary or may be performed at other times, such as periodically, in response to a user request, or in response to an event. The operation then terminates.

FIG. 6 is a flowchart outlining an exemplary operation for generating a communication using a social network input dictionary in accordance with one illustrative embodiment. The operation outlined in FIG. 6 may be performed, for example, by an end user device, such as a client device, for example. As shown in FIG. 6, the operation starts with the end user device receiving user input (step 610). The user input is converted into one or more text keys (step 620). A next text key of the one or more text keys is selected for processing (step 630). The text key is compared to the social network input dictionary (step 640) and a determination is made as to whether the text key matches one or more terms in the social network input dictionary (step 650).

If the text key does not match a term in the social network input dictionary, the text key itself may be output (step 660). Alternatively, if the text key matches at least one term in the social network input dictionary, then a determination is made as to whether the matching term(s) are in the social network specific portion of the social network input dictionary (step 665). If so, then a determination is made as to whether the intended recipient is a member of the social network or not (step 670). If the recipient is not a member of the social network, then the matching term is excluded from the text message and the text key may be output in its stead (step 680). Otherwise, if the recipient is a member of the social network or if the matching term is not in the social network specific portion, i.e. it is in the general portion, then a matching term may be selected based on a relative ranking criteria of the one or more matching terms and the selected matching term output for inclusion in the text message (step 690). It should be appreciated that the steps 670-690 may be performed separately for each of a plurality of intended recipients of the text message with separately generated text messages being a result, as discussed previously.

A determination is made as to whether there are more text keys to process (step 700). If so, the operation returns to step 630 and the process is repeated with the next text key in the user input. If there are no more text keys to process, the text message is compiled from the identified matching terms and/or text keys (step 710). The text message is then transmitted to the intended recipient(s) via the data network (step 720). The operation then terminates.

Thus, the illustrative embodiments provide mechanisms for automatically updating input dictionaries based on the monitoring of communications within a digital social network. In this way, the input dictionaries may be customized to the particular terms that are used within the social network and which may not be recognizable to individuals that are not members of the social network. Moreover, the mechanisms of the illustrative embodiments may update these input dictionaries as terms gain and wane in popularity so that the input dictionary always reflects the most recent terminology used by the members of the social network. Furthermore, the input dictionaries may be updated to include terms used within the social network, regardless of whether a particular user has actually used the term or not themselves. In this way, the term may be recognized even on the first use of the term by a user as long as the term has been used within the social network previously.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for communication within a digital social network using a social network input dictionary, comprising:

monitoring communications within the digital social network to identify a term used by one or more members of the digital social network, the digital social network being a plurality of members who are associated with one another via one of a centralized or distributed digital social network provider system;

measuring a usage of the term by the one or more members of the digital social network;

determining if the term is present in a social network input dictionary for the digital social network;

determining if the measured usage of the term by the one or more members of the digital social network meets a criteria for addition of the term to the social network input dictionary;

adding the term to the social network input dictionary for the digital social network if the term is not already present in the social network input dictionary and the measured usage of the term meets the criteria; and utilizing the social network input dictionary to generate textual representations of messages input by one or more of the members of the digital social network, wherein the social network input dictionary comprises general terms and digital social network specific terms, wherein utilizing the social network input dictionary to generate textual representations of messages input by one or more of the members of the digital social network comprises:

receiving user input from a member of the plurality of members, the user input specifying a message to be communicated to a recipient;

comparing the user input to the social network input dictionary to match portions of the user input to terms in the social network input dictionary;

using the matched terms to generate a textual representation of the user input;

identifying the recipient of the message to be communicated; and determining if the recipient is a member of the plurality of members of the digital social network, and wherein comparing the user input to the social network input dictionary comprises:

using only general terms for matching with portions of the user input if the recipient is not a member of the plurality of members of the digital social network; and using both the general terms and the digital social network specific terms for matching with portions of the user input if the recipient is a member of the plurality of members of the digital social network.

2. The method of claim 1, wherein the term is a term specific to the digital social network that is not generally known to persons outside of the digital social network.

3. The method of claim 1, wherein the criteria for addition of the term to the social network input dictionary is a frequency of use within a predetermined period of time.

4. The method of claim 1, wherein the social network input dictionary is a centralized social network input dictionary, and wherein the method further comprises:

distributing an update of local versions of the social network input dictionary to data processing devices associated with the plurality of members of the digital social network based on the current state of the centralized social network input dictionary at the time of the update, each data processing device associated with the plurality of members having its own local version of the social network input dictionary.

5. The method of claim 4, wherein the update of the local versions of the social network input dictionary is distributed either periodically or in response to a change in the centralized social network input dictionary.

6. The method of claim 1, wherein the social network input dictionary is local to a data processing device associated with one member of the plurality of members, and wherein the method further comprises:

distributing, from the data processing device associated with the one member to data processing devices associated with the other members of the plurality of members, an update of local versions of the social network input dictionary, each data processing device associated with the plurality of members having its own local version of the social network input dictionary.

7. The method of claim 1, further comprising:
updating usage information for the term in the social network input dictionary if the term is determined to be already present in the social network input dictionary; and
adjusting a relative ranking of the term within the social network input dictionary based on the updated usage information.

8. The method of claim 1, wherein utilizing the social network input dictionary to generate textual representations of messages input by one or more of the members of the digital social network comprises using the term to generate a textual representation of a message input by a member of the digital social network that has not previously used the term in a communication within the digital social network.

9. The method of claim 1, further comprising:
monitoring the social network input dictionary to determine if one or more terms in the social network input dictionary have a current usage metric that meets a threshold indicative of declining use of the term in communications within the digital social network; and
reducing a relative priority of the one or more terms in the social network input dictionary if the current usage metric meets the threshold.

10. The method of claim 9, further comprising:
determining if the usage metric or relative priority of the one or more terms in the social network input dictionary meet criteria for removal of the one or more terms from the social network input dictionary; and
deleting an entry in the social network input dictionary associated with the one or more terms if an associated usage metric or relative priority of the one or more terms meet the criteria for removal.

11. The method of claim 1, wherein the message is to be communicated to a plurality of recipients, and wherein the identifying the recipient, determining if the recipient is a member, comparing the user input to the social network input dictionary, and using the matched terms to generate the textual representation of the user input are performed for each recipient of the plurality of recipients.

12. The method of claim 11, wherein at least one first recipient of the plurality of recipients is a member of the plurality of members, and wherein at least one second recipient of the plurality of recipients is not a member of the plurality of members, and wherein using the matched terms to generate the textual representation of the user input results in a textual representation for the at least one first recipient that is different from the at least one second recipient.

13. The method of claim 1, wherein the communications that are monitored are communications between mobile electronic devices used by the plurality of members.

14. The method of claim 13, wherein the mobile electronic devices are wireless communication devices, and wherein the social network input dictionary is utilized to generate textual representations of messages input by the one or more members using a Text on 9 keys (T9) input interface of the wireless communication devices.

15. The method of claim 13, wherein the mobile electronic devices are wireless communication devices, and wherein the social network input dictionary is utilized to generate textual representations of message input by the one or more members using a voice recognition input interface of the wireless communication devices.

16. The method of claim 1, wherein the social network input dictionary has a first portion in which entries for general terms are stored and a second portion in which entries for digital social network specific terms are stored, and wherein only the second portion is updated by the addition of terms identified in communications within the digital social network or by the updating of usage information for terms identified in communications within the digital social network.

17. A system, comprising:
a processor; and
a memory, wherein the memory comprises instructions, which when executed by the processor, cause the processor to:
monitor communications within a digital social network to identify a term used by one or more members of the digital social network, the digital social network being a plurality of members who are associated with one another via one of a centralized or distributed digital social network provider system;
measure a usage of the term by the one or more members of the digital social network;
determine if the term is present in a social network input dictionary for the digital social network;
determine if the measured usage of the term by the one or more members of the digital social network meets a criteria for addition of the term to the social network input dictionary;
add the term to the social network input dictionary for the digital social network if the term is not already present in the social network input dictionary and the measured usage of the term meets the criteria; and
utilize the social network input dictionary to generate textual representations of messages input by one or more of the members of the digital social network, wherein the social network input dictionary comprises general terms and digital social network specific terms, wherein utilizing the social network input dictionary to generate textual representations of messages input by one or more of the members of the digital social network comprises:
receiving user input from a member of the plurality of members, the user input specifying a message to be communicated to a recipient;
comparing the user input to the social network input dictionary to match portions of the user input to terms in the social network input dictionary;
using the matched terms to generate a textual representation of the user input;
identifying the recipient of the message to be communicated; and
determining the recipient is a member of the plurality of members of the digital social network, and wherein comparing the user input to the social network input dictionary comprises:
using only general terms for matching with portions of the user input if the recipient is not a member of the plurality of members of the digital social network; and
using both the general terms and the digital social network specific terms for matching with portions of the user input if the recipient is a member of the plurality of members of the digital social network.

18. A computer program product comprising a computer useable storage medium having a computer readable program stored thereon, wherein the computer readable program, when executed on a computing device, causes the computing device to:
monitor communications within the digital social network to identify a term used by one or more members of the digital social network, the digital social network being a plurality of members who are associated with one another via one of a centralized or distributed digital social network provider system;

measure a usage of the term by the one or more members of the digital social network;

determine if the term is present in a social network input dictionary for the digital social network;

determine if the measured usage of the term by the one or more members of the digital social network meets a criteria for addition of the term to the social network input dictionary;

add the term to the social network input dictionary for the digital social network if the term is not already present in the social network input dictionary and the measured usage of the term meets the criteria; and utilize the social network input dictionary to generate textual representations of messages input by one or more of the members of the digital social network, wherein the social network input dictionary comprise general terms and digital social network specific terms, wherein utilizing the social network input dictionary to generate textual representations of messages input by one or more of the members of the digital social network comprises:

receiving user input from a member of the plurality of members, the user input specifying a message to be communicated to a recipient;

comparing the user input to the social network input dictionary to match portions of the user input to terms, in the social network input dictionary;

the matched terms to generate a textual representation of the user identifying the recipient of the message to be communicated; and determining if the recipient is a member of the plurality of members of the digital social network, and wherein comparing the user input to the social network input dictionary comprises:

using only general terms for matching with portions of the user input if the recipient is not a member of the plurality of members of the digital social network; and using both the general terms and the digital social network specific terms for matching with portions of the user input if the recipient is a member of the plurality of members of the digital social network.

* * * * *